US008032294B2

(12) United States Patent
Loeffler et al.

(10) Patent No.: US 8,032,294 B2
(45) Date of Patent: Oct. 4, 2011

(54) PROCEDURE AND DEVICE FOR DETERMINING THE COMPOSITION OF A FUEL MIXTURE

(75) Inventors: Axel Loeffler, Backnang (DE);
Wolfgang Fischer, Gerlingen (DE);
Roland Karrelmeyer, Bietigheim-Bissingen (DE); Gerald Graf, Gaertringen (DE); Daniel Scherrer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/437,239

(22) Filed: May 7, 2009

(65) Prior Publication Data

US 2009/0281708 A1    Nov. 12, 2009

(30) Foreign Application Priority Data

May 8, 2008 (DE) .................. 10 2008 001 668

(51) Int. Cl.
*F02B 7/00* (2006.01)
*F02M 7/28* (2006.01)
(52) U.S. Cl. .................. 701/111; 123/431; 123/435
(58) Field of Classification Search .......... 701/103–105, 701/111; 123/1 A, 27 GE, 525–527, 431, 123/575, 198 A, 435–436, 90.15, 299, 300, 123/305
See application file for complete search history.

(56) References Cited

U.S. PATENT DOCUMENTS

| 5,050,555 | A | | 9/1991 | Mitsumoto | |
|---|---|---|---|---|---|
| 5,499,607 | A | * | 3/1996 | Tomisawa | 123/435 |
| 6,675,748 | B2 | * | 1/2004 | Ancimer et al. | 123/27 R |
| 6,938,466 | B2 | * | 9/2005 | Bonadies et al. | 73/114.53 |
| 6,941,929 | B2 | * | 9/2005 | Shinzawa | 123/357 |
| 6,947,830 | B1 | * | 9/2005 | Froloff et al. | 701/111 |
| 7,028,532 | B2 | * | 4/2006 | Shinzawa | 73/35.02 |
| 7,117,862 | B2 | * | 10/2006 | May | 123/674 |
| 7,258,105 | B2 | * | 8/2007 | Kangler | 123/434 |
| 7,357,101 | B2 | * | 4/2008 | Boyarski | 123/1 A |
| 7,435,080 | B2 | * | 10/2008 | Joklik et al. | 431/4 |
| 7,556,030 | B2 | * | 7/2009 | Ashida et al. | 123/575 |
| 7,599,781 | B2 | * | 10/2009 | Yamaguchi et al. | 701/103 |
| 7,640,913 | B2 | * | 1/2010 | Blumberg et al. | 123/304 |
| 2005/0085991 | A1 | * | 4/2005 | Bonadies et al. | 701/104 |
| 2009/0024303 | A1 | * | 1/2009 | Schneider et al. | 701/103 |
| 2009/0088983 | A1 | * | 4/2009 | Bauer et al. | 702/24 |

(Continued)

FOREIGN PATENT DOCUMENTS

DE    10 2007 023 900    11/2008

(Continued)

OTHER PUBLICATIONS

Xingcai, Lü, "Experimental Study on the Auto-Ignition and Combustion Characteristics in the Homogeneous Charge Compression Ignition (HCCI) Combustion Operation with Ethanol/$n$-Heptane Blend Fuels by Port Injection", Fuel, vol. 85, No. 17-18 (2006), pp. 2622.2631, Published Dec. 1, 2008.

*Primary Examiner* — Hai Huynh
(74) *Attorney, Agent, or Firm* — Merchant & Gould P.C.

(57) ABSTRACT

The procedure and device of the present disclosure enable an accurate determination of the composition of the fuel mixture at a self-igniting combustion engine on the basis of present sensor signals. The procedure and device of the present disclosure furthermore enable the detection and compensation of a combustion that is unstable due to the composition of the fuel mixture.

9 Claims, 1 Drawing Sheet

U.S. PATENT DOCUMENTS

| | | | |
|---|---|---|---|
| 2009/0125207 A1* | 5/2009 | Nomura et al. | 701/100 |
| 2009/0210138 A1* | 8/2009 | Hokuto et al. | 701/103 |
| 2009/0223485 A1* | 9/2009 | Hamedovic et al. | 123/435 |
| 2009/0306875 A1* | 12/2009 | Jiang et al. | 701/102 |
| 2010/0036586 A1* | 2/2010 | Gourves | 701/103 |
| 2010/0037858 A1* | 2/2010 | Kang et al. | 123/406.23 |

FOREIGN PATENT DOCUMENTS

| | | |
|---|---|---|
| DE | 10 2007 060 223 A1 | 6/2009 |
| JP | 7-34931 * | 2/1995 |

\* cited by examiner

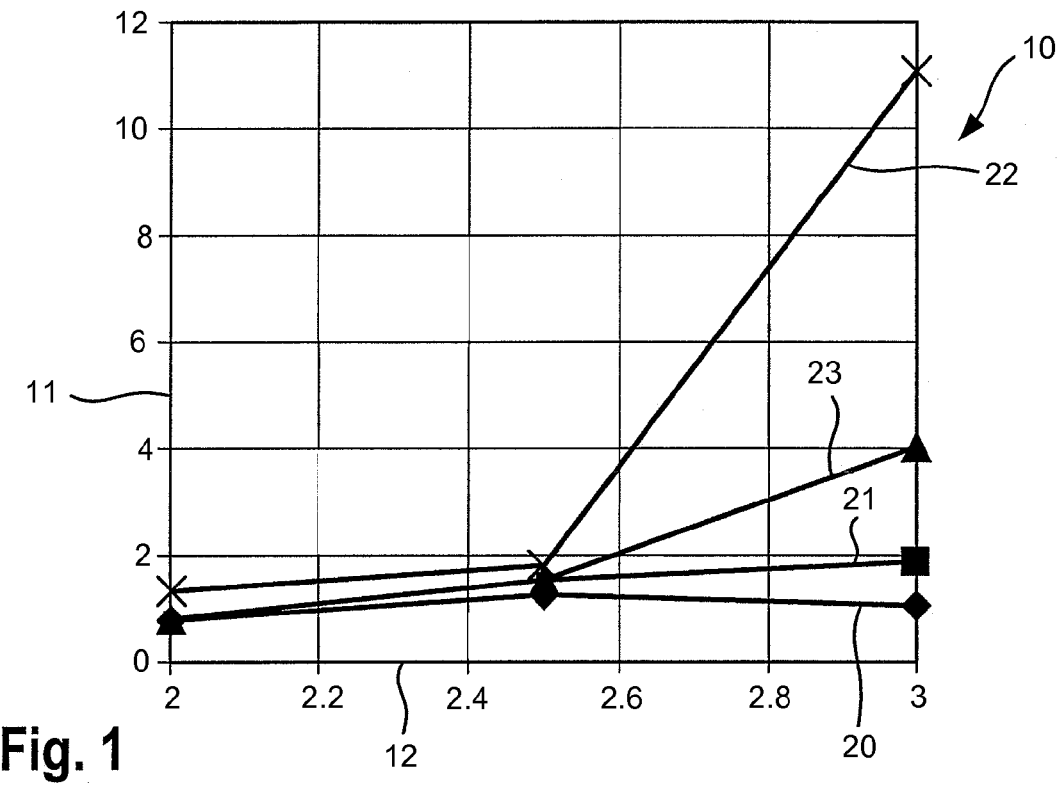
Fig. 1
Fig. 2
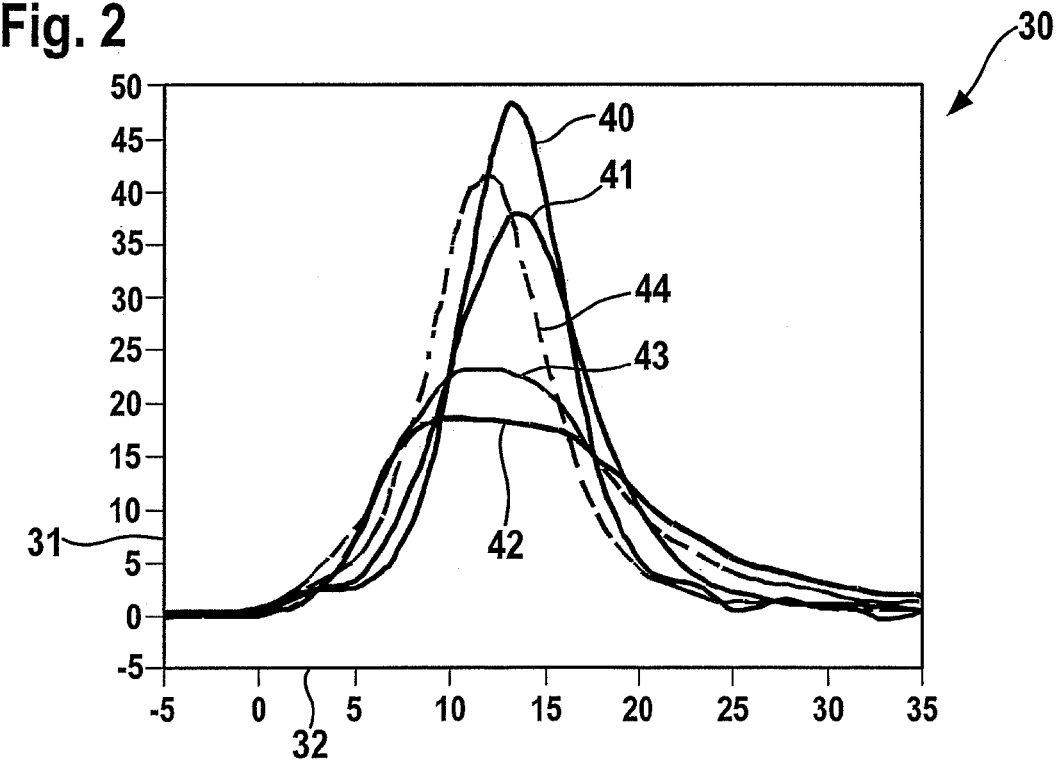

PROCEDURE AND DEVICE FOR DETERMINING THE COMPOSITION OF A FUEL MIXTURE

TECHNICAL FIELD

The invention concerns a procedure for determining the composition of a fuel mixture consisting of a first fuel and at least a second fuel for operating a self-igniting combustion engine with at least one sensor that is determining the course of the combustion in at least one cylinder of the combustion engine.

The invention furthermore concerns a device for determining the composition of a fuel mixture consisting of a first fuel and at least a second fuel for operating a self-igniting combustion engine with a variable or partially variable valve operation for a variable adjustment of the valve openings in relation to the crankshaft angle and for a variable adjustment of the opening profile of the valves, with a direct injection for metering the fuel mixture, with at least one sensor for determining the combustion process in at least one cylinder of the combustion engine and with a regulating unit for regulating the combustion engine on the basis of the output signal of the sensor.

BACKGROUND

Self-igniting Otto operated combustion engines are known under the name gasoline HCCI-(homogeneous charge compression ignition) or CAI-procedure (controlled auto ignition). They provide a significant potential for a fuel saving at a simultaneously reduced hazardous raw emission compared to usual spark-igniting procedures.

Self-igniting Otto combustion engines are usually equipped with a variable valve operation and with a benzene direct injection. In order to create the CAI-operation different strategies are known. The common target of these strategies is to realize a relatively big remaining gas mass in the cylinder of the combustion engine. This hot remaining gas causes the introduction of the combustion during the compression phase.

The control or the regulation of the combustion in a self-igniting combustion engine advantageously takes place on the basis of a combustion chamber signal. Cylinder pressure sensors are here preferably used as sensors, which determine the pressure course during the combustion stroke in high resolution. Thereby for example the average pressure pmi in at least combustion chamber of the combustion engine can be provided as a measure for the mechanical work that is carried out by the combustion engine and the position of the combustion focus MFB50 (mass fraction burnt 50%) that is determined by the pressure course can be provided as a reference variable of the regulation.

Spark-igniting as well as self-igniting combustion engines on the basis of Otto engines are usually operated with fuel consisting of hydrocarbons made of fossil fuels on the basis of refined oil. Ethanol that has been produced from re-growing natural resources (plants) or another alcohol is additionally admixed to this fuel in different mixture ratios. In the USA and in Europe often a mixture of 70-85% ethanol and 15-30% benzene is used under the trademark E85. The combustion engines have to be construed in such a way that they can be operated with pure benzene as well as with mixture up to E85; this is termed with "flex-fuel-operation". For an economical operation with a low emission of hazardous substances at a simultaneously high engine power and good starting behavior the operating parameters in the flex-fuel-operation have to be adjusted to the correspondingly present fuel mixture. A stoichiometric fuel-air-ratio is for example available at 14.7 volume parts of air per part of benzene, but when using ethanol an air ratio of 9 volume parts has to be adjusted. Low and/or slow changes of the alcohol content can be detected and considered by the engine management of the combustion engine for example with the aid of a lambda probe. But for example after refueling also quick changes with significant deviations of the composition of the fuel mixture can occur. According to the state of the art such fast changes of the composition of the fuel can be detected with the aid of an alcohol sensor. But this component increases the costs of the combustion engine.

The admixing of ethanol, in particular at a high admixing rate of 50% to 85%, has a significant influence upon the very sensitive CAI-combustion. Measures for compensating this influence are therefore strictly required.

From DE 10 2007 023 900.0 of the applicant a procedure is known for determining the composition of a fuel mixture consisting of a first fuel and a second fuel for operating a combustion engine, whereby the first and the second fuel provide different rates of combustion and/or different specific energy contents and whereby the combustion engine provides at least one pressure sensor in at least one combustion chamber, with which a temporal and/or angle synchronic pressure course is determined in the combustion chamber. Thereby it is disadvantageously that the influence of the ethanol admixing upon the evaluated standard characteristics, as the average induced pressure pmi, as a measure for the work that has been carried out by the combustion engine or as the position of the combustion focus MFB50, is not strong enough in order to enable a sufficiently accurate determination of the composition of the fuel mixture. This applies in particular for high admixing rates of more than 50% ethanol.

From DE 10 2007 060 223.7 of the applicant a procedure is known for determining the composition of a fuel mixture consisting of a first fuel and a second fuel or for determining the quality of a fuel for operating a combustion engine with at least one cylinder pressure sensor in at least one cylinder of the combustion engine for determining the pressure course during a combustion stoke and a cylinder pressure based engine regulation for regulating the load and combustion position of the combustion engine. It is thereby provided that the determination of the composition of the fuel mixture or the quality of the fuel takes place with the aid of regulating information of the cylinder pressure based engine regulation. Furthermore the application of the procedure is provided for determining the composition of a fuel mixture and/or the quality of a fuel for operating a spark-igniting and/or self-igniting combustion engine. The CAI-combustion procedure is in particular instable when operating with different fuel mixtures without additional measures at an operation of the combustion engine with an average to high partial load, thus at an average induced pressure higher 3 bar. The direct determination of the composition of the fuel mixture on the basis of the regulating information of the cylinder pressure based engine regulation is enabled only very inaccurately under these operating conditions.

It is the task of the invention to provide a procedure and a device, which enable an accurate determination of the fuel composition of a fuel mixture consisting of at least two fuels for operating a self-igniting combustion engine.

SUMMARY

The task of the invention that concerns the procedure is thereby solved, that a measure for the stability of the combustion process is created from a parameter that is characterizing a combustion process in at least one cylinder of the combustion engine, and that the determination of the composition of the fuel mixture takes place by the measure for the stability of the combustion process. The instability of the CAI-combustion is the main characterizing feature for example for a high ethanol admixing rate to benzene. The influence of an ethanol admixing upon the stability of the combustion is particularly stronger than upon the standard characteristics average induced pressure pmi and position of the combustion focus MFB50. The instability of the combustion is already at an average partial load that big that it cannot be evaluated anymore as acceptable. A procedure, which detects this instability and determines thereof the admixing rate and compensates its effect directly, is therefore very advantageous.

A measure that can be simply determined for the stability of the combustion can be won by using the standard deviation of the position of a combustion focus that has been created by the number of combustion cycles or the standard deviation of an average induced cylinder pressure or the standard deviation of a maximum pressure gradient in the cylinder or the standard deviation of a maximum differential energy release or the standard deviation of a maximum integral energy release or the relation of the standard deviation to the average value of the average induced cylinder pressure or a parameter that is deduced from these parameters considered by itself or in combination of at least two of these parameters as a measure for the stability of the combustion process in the at least one cylinder. These parameters or at least a part of these parameters are already present at a self-igniting combustion engine that is regulated on the basis of a combustion chamber signal; thus no additional components are required for implementing the procedure. The number of the combustion cycles that are each considered for the statistic evaluation can be predefined adjusted to the required accuracy as well as to the required evaluation speed. It can furthermore be predefined depending on operating parameters of the combustion engine. The standard deviation of the parameters delivers a direct measure for the scattering of the parameters that are characterizing the combustion in consecutive combustion processes and therefore a statement about the stability of the combustion. At a fuel mixture with an ethanol admixing rate higher than 50% the standard deviation of the position of the combustion focus MFB50 can for example change by a crankshaft angle of 1.3° at a variation of the ethanol admixing rate of 5%. This can be evaluated well, whereby a very good detection accuracy of the composition of the fuel mixture of 3% to 5% at high ethanol admixing rates can be achieved. Besides the direct statistic evaluation of the cylinder pressure based parameters also further characteristics and parameters that clearly correlate with these parameters can be evaluated for determining the composition of the fuel mixture.

The parameters that have to be evaluated for determining the stability of the combustion can be preferably won thereby that the determination of the parameters that characterize the combustion process takes place by a determination of a cylinder pressure or a determination of a mechanical vibration signal at the combustion engine or en engine speed of the combustion engine or a ionic current of a probe in the cylinder each considered by itself or in combination of at least two of these measuring procedures. Thereby preferably the sensor is used, which is provided already for regulation the combustion of the self-igniting combustion engine based on a combustion chamber signal.

According to a particularly preferred embodiment of the invention it can be provided that the creation of the measure for the stability of the combustion process takes place in predefined operating points of the combustion engine. Thus the statistic evaluation of the combustion in idle enables well reproducible operating conditions, which are often present. The evaluation at an average to high load of the combustion engine on the other hand causes big, well evaluable differences in the stability of the combustion at different fuel mixtures. If it is provided that a threshold value is predefined for the measure for the stability of the combustion process and that operating parameter of the combustion engines are adjusted in such a way that the measure for the stability of the combustion process does not exceed the threshold, the obtained measure for the stability of the combustion process can be directly used for stabilizing the combustion. Thus stability improving measures can be directly initiated for example at an increase of the combustion stability after a mixture change by refueling in order to compensate this effect.

A stabilizing of the combustion can be thereby achieved that an increase of a remaining gas mass in the cylinders of the combustion engine or a early shifting of a nominal value of a regulation of the position of the combustion focus or an introduction of an pre-injection of fuel each considered by itself or in combination of at least two of these measure in order to comply with the threshold for the measure for the stability of the combustion process is provided. All measures serve the stability improving temperature increase during the compression phase. Thus the introduction of a pre-injection of fuel for example causes an energy release in the inter-compression and thereby a temperature increase of the remaining gas at the CAI-procedure with remaining gas retention.

If the amount of the hot remaining gas that is present in the cylinders of the combustion engine during the compression phase is increased, this also causes an increase of the temperature of the gas mixture and an improved introduction of the combustion during the compression phase. Therefore it can be provided that the increase of the remaining gas mass in the cylinder of the combustion engine takes place by an early closing of the corresponding outlet valve during the emission stroke or by a short opening of the corresponding outlet valve during the suction stroke. At combustion engines with several output valves per cylinder all outlet vales can be controlled correspondingly.

The correcting intervention into the regulation of the combustion engine for stabilizing the combustion takes place depending on the created measure for the stability. The level of the necessary correcting intervention is therefore depending on the instability of the combustion of the combustion engine and therefore the composition of the fuel mixture. Therefore it can be provided in an alternative embodiment of the invention, that the determination of the composition of the fuel mixture takes place with the aid of the necessary correcting intervention into the regulation of the combustion engine in order to comply with the threshold for the measure for the stability of the combustion process.

The procedure can be applied preferably for determining the composition of a benzene/alcohol-fuel mixture and/or for regulating or controlling the stability of the combustion process of a self-igniting combustion engine that is operated with benzene or benzene/alcohol-fuel mixture.

The task of the invention that concerns the device is thereby solved that the output signal of the sensor is delivered to an engine electronic as a measure for the combustion process and that it can be saved there by a predefined amount of combustion cycles, that a statistic evaluation of the combustion processes can be implemented within the engine electronic for determining a measure for the stability of the combustion and that the composition of the fuel mixture can be determined from the created measure for the stability of the combustion and that a correction of the regulation of the combustion engine can be carried out. The saving of the sensor data of consecutive combustion cycles enables the statistics evaluation, with which the stability of the combustion can be evaluated. If the instability of the combustion is determined an intervention can be directly undertaken thereof into the controlling or regulation of the combustion engine for stabilizing the combustion. Therefore the engine electronic can be directly connected to the regulation unit of the combustion engine or the regulation is an integral component of the engine electronic. Admixing for example of ethanol to benzene causes a significant change of the combustion stability depending on the admixing rate. With the aid of a parameter that describes the combustion stability the composition of the fuel mixture can be thereby assumed. The so determined composition of the fuel mixture can be provided to further control unit functions, as for example the lambda function, which then adjusts its calculations correspondingly. Furthermore the detection and compensation of an ethanol admixing can be combined with a cylinder pressure based combustion position regulation, as for example with the average induced pressure pmi or the position of combustion focus MFB50 as reference variable.

If it is provided that at least one cylinder pressure sensor or at least one sensor for determining the mechanical vibration of the combustion engine or at least one engine speed sensor or at least one sensor for determining the ionic current in a cylinder for determining the course of the combustion, then the course of the combustion can be determined in a sufficient temporal solution. With these sensors the position of the combustion focus or an average induced cylinder pressure or a maximum cylinder pressure gradient or a maximum differential energy release or a maximum integral energy release can be determined. By these parameters the engine electronic can determine by a predefined amount of combustion cycles the corresponding standard deviation or also the relation of the standard deviation to the average value for example of the average induced cylinder pressure as a measure for the stability of the combustion by a corresponding statistic evaluation. Preferably the sensors are used, which are provided for the regulation of the combustion of the self-igniting combustion engine on the basis of a combustion chamber signal.

BRIEF DESCRIPTION OF THE DRAWINGS

The invention is further explained in the following with the aid of the embodiment that is shown in the figures. It is shown:

FIG. 1 shows in a first diagram the effect of the combustion stability on the standard deviation sMFB50 of the position of the combustion focus at a different load (in pmi) of a self-igniting combustion engine, FIG. 2 shows in a second diagram the influence of the fuel composition on the differential heating course dQ, against the crankshaft angle.

DETAILED DESCRIPTION

In a first diagram 10 FIG. 1 shows the effect of the combustion stability on a standard deviation sMFB50 11 of the position of the combustion focus at a different load of a self-igniting combustion engine. The combustion engine is thereby operated with benzene or with a mixture of benzene and ethanol according to the so-called CAI-procedure (CAI: controlled auto ignition), which is also called gasoline HCCI-procedure (HCCI: homogeneous charge compression ignition).

In the first diagram 10 the standard deviation sMFB50 11 is stated in degrees crankshaft angle opposed to an average induced pressure pmi 12 in bar. The average induced pressure pmi 12 defines the load of the combustion engine at an engine speed of 2000 U/min as it is present in the shown embodiment. The standard deviation sMFB50 11 of the position of the combustion focus is determined in the shown embodiment by 20 consecutive combustion cycles. It provides a measure for the stability of the combustion, whereby a low standard deviation sMFB50 11 occurs at a stabile combustion and a correspondingly a high scattering of the position of the combustion focus as well as a high standard deviation sMFB50 11 occur at an unstable combustion.

Four curves sMFB50 20, 21, 22, 23 are shown in a first diagram 10 for different fuels and fuel mixtures. Thereby each standard deviation sMFB50 11 has been determined for the average induced pressure pmi 12 of 2bar, of 2.5 bar and of 3 bar.

The curve sMFB50 S95 20 shows the dependency of the standard deviation sMFB50 11 on the load of the combustion engine for the fuel super 95, thus benzene with an octane rating of 95. The curve sMFB50 E50 21 shows the same dependency for a fuel mixture E50 consisting of 50% benzene and 50% ethanol, the curve sMFB50 E85 22 for a fuel mixture consisting of 15% benzene and 85% ethanol. The curve sMFB50 E85/−4° KW 23 shows the dependency of the standard deviation sMFB50 11 on the average induce pressure pmi 12 for a fuel mixture E85, whereby an increase of the negative valve overlap of −4° crankshaft angle has been provided as a measure for stabilizing the combustion. This measure labeled with ΔEVC (exhaust valve closing) causes that a certain additional remaining gas mass is kept back in the cylinder.

For all load ranges of the combustion engine an increase of the standard deviation sMFB50 11 appears at an increased ethanol content of the fuel mixture, which is equivalent to an increase of the instability of the combustion. For each fuel also an increase of the standard deviation sMFB50 11 appears at an increasing load of the combustion engine, thus at an increasing average induced pressure pmi 12.

A strong dependency of the standard deviation sMFB50 11 on the composition of the fuel mixture can be noticed in particular from an average load of the combustion engine at an average induced pressure pmi 12 of 3 bar. While pure benzene of the quality super 95 shows a standard deviation sMFB50 11 of ca. 1° crankshaft angle, it increases at a fuel mixture E50 already up to a value of ca. 2° crankshaft angle. Without the stability improving measures the standard deviation sMFB50 11 for a fuel mixture E85 increases to a value of ca. 11° crankshaft angle, which means a significant influence of the fuel composition on the stability of the combustion that is not acceptable for the operation of the combustion engine. The combustion regulation is thereby active with the reference variables average induced pressure pmi 12 and position of the combustion focus MFB50 in the selected embodiment. An increase of the ethanol content by 5% between the fuel mixtures E50 and E85 means approximately an increase of the standard deviation MFB50 11 by 1.3° crankshaft, was can be well detected.

The curves sMFB50 21, 21, 22, 23 shows that the increasing instability of the CAI-combustion shows a significant characteristic of a high ethanol admixing rate. The influence of the ethanol admixing on the stability of the combustion is thereby significantly stronger than on the standard characteristics average induced pressure pmi 12 or position of the combustion focus MFB50, which are used as reference variables at usual regulating concepts for self-igniting combustion engines. It can furthermore be noticed that this instability is already so big at an average partial load, characterized by an average induced pressure pmi 12 of 3 bar, that it cannot be evaluated as acceptable anymore. Therefore a procedure is very advantageous, which detects this instability, determines thereof the admixing rate and compensates directly its effects.

It can be furthermore seen from the course of the curve MFB50 E85/−4° KW 23 for a fuel mixture E85 and a closing of the outlet valve that is distorted by ΔEVC=−4° crankshaft compared to the curve sMFB50 E85 22, that the negative valve overlap with the remaining gas mass that has thereby been achieved in the cylinder causes a significant improve of the combustion stability. Alternatively to the stabilizing of the combustion remaining gas can also be sucked back by a short opening of the outlet valve during the suction phase.

In a second diagram 30 FIG. 2 shows the influence of the fuel composition on the differential heating course dQ 31, again for a self-igniting combustion engine with an active combustion regulation according to the CAI-procedure. Benzene or a mixture of benzene and ethanol are thereby provided as fuel.

The differential heating course dQ 31 is shown in joule per degree crankshaft as opposed to the crankshaft in degree crankshaft. The differential heating course dQ 31 can be calculated form a measured cylinder pressure course and provides a measure for the energy release per degree crankshaft.

The second diagram 30 contains five curves dQ 40, 41, 42, 43, 44, which show the dependency of the differential heating course dQ 31 on the crankshaft 32 for different fuel and fuel mixtures as well as for different measures that are stabilizing the stability of the combustion. Thereby the individual values of the curves dQ 40, 41, 42, 43, 44 are determined over 20 combustion cycles.

Curve dQ S95 40 shows the differential heating course dQ 31 depending on the crankshaft 32 for benzene of the quality S95. In contrast the curve dQ E50 41 shows the differential heating curse dQ 31 for a fuel mixture E50, thus 50% benzene and 50% ethanol, and curve dQ E85 42 shows the differential heating course dQ 31 for a fuel mixture E85, thus 15% benzene and 85% ethanol. The curve dQ E85/−4° KW 43 shows the differential heating course dQ 31 for a fuel mixture E85 at an operating of the combustion engine with the increase of the negative valve overlap of −4° as a measure that is improving the stability of the combustion, while curve dQ E85/−8° KW 44 is obtained at an increase of the valve overlap of −8°.

The courses of the curve dQ S95 40, the curve dQ E50 41 and the curve dQ E85 42 show the effect of an increasing ethanol admixing rate on the differential heating course dQ 31. The less localized, averagely more delayed combustion at the fuel mixture E85 compared to the fuel super 95 can be clearly noticed. This can be noticed by the course of the curve dQ E85 42 that spreads over a bigger crankshaft angle range as compared to the curve dQ S95 40 and the lower maximum value at the curve dQ E85 42. This curve dQ E50 41 lies between the two curves dQ S95 40 and dQ E85 42. The result corresponds with the statistic evaluation of the standard deviation sMFB50 11, as it is shown in FIG. 1.

By stability improving measures, like the increased holding back of remaining gas by an early closing of the exhaust valve by −4° crankshaft corresponding to the curve dQ E85/−4° KW 43 or by −8° corresponding to the curve dQ E85/−8° W 44, the heating course can be approximated again to the initial curve dQ S95 40 for a pure benzene.

It shows from the contexts that are shown in FIGS. 1 and 2 that a measure for the stability of the combustion can be obtained with the aid of a statistic evaluation of the parameters that are characterizing the combustion, which strongly correlates with the composition of the fuel mixture and which can be simply evaluated. This enables the determination of the composition of the fuel mixture on the one hand, and on the hand the introduction of measures that are stabilizing the combustion.

The procedure is based on the presence of a response from at least one combustion chamber of the combustion engine, as it can be obtained with the aid of a measurement of the cylinder pressure, a mechanical vibration signal, the engine speed of the combustion engine or an ionic current.

On the basis of the obtained signal at least one characteristic is determined, which characterizes the combustion and which is evaluated over several combustion cycles, in order to get a characteristic that is characterizing the stability of the combustion.

Suitable characteristics that characterize the stability of the combustion are for example the cylinder pressure based characteristics:

- standard deviation of the position of the combustion focus MFB50
- standard deviation of the average induced pressure pmi
- standard deviation of the maximum pressure gradient dpmax
- standard deviation of the maximum differential energy release dQmax
- standard deviation of the maximum integral energy release dQmax or thereof deduced characteristics like the relation of the standard deviation to the average value of the average induced pressure pmi.

Furthermore parameters are suitable, which have been calculated from the signals of the measurement of the cylinder pressure, the mechanical vibration signal, the engine speed of the combustion engine or the ionic current and which clearly correlate with the stated cylinder pressure based characteristics.

If for example after refueling an increase of the combustion stability is noticed in a CAI-operating point, immediately stability improving measures can be initiated, in order to compensate this effect. Suitable for this purpose are for example an increase of the hot remaining gas mass by an early closing of the exhaust valve, an early shifting of the nominal value of MFB50-regulation or the introduction of a pre-injection amount, which causes an energy release in the intercompression and therefore a temperature increase of the remaining gas.

This can happen in the sense of a regulation, at which the nominal value is a maximum value for the instability characteristic, for example the standard deviation sMFB50 11 of the position of the combustion focus, or of a controlling. In the case of a regulation the detection can also take place indirectly, thus not form the increase of the instability characteristic but from the level of the necessary correcting intervention.

The determined composition of the fuel mixture can be provided to further control unit functions, as for example the lambda function, which can thereof adjust its calculations correspondingly.

It is furthermore possible to combine the detection and compensation of the composition of the fuel mixture with a cylinder pressure improving combustion position regulation, as for example with the average induced pressure pmi 12 or the position of the combustion focus MFB50 as reference variables.

The invention claimed is:

1. A method of determining a composition of a fuel mixture consisting of a first fuel and at least a second fuel for operating a self-igniting combustion engine with at least one sensor that is determining a course of combustion in at least one cylinder of the combustion engine, the method comprising:
    creating a measure for stability of the combustion process from a parameter that characterizes a combustion process in at least one cylinder of the combustion engine, wherein the determination of the composition of the fuel mixture takes place from the measure for the stability of the combustion process;
    adjusting operating parameters of the combustion engines such that the measure for the stability of the combustion process does not exceed a predefined threshold value for the stability of the combustion process; and
    providing one or more of the following for complying with the predefined threshold value:
        an increase of a remaining gas mass in the at least one cylinder of the combustion engine;
        an early shifting of a nominal value of a regulation of a combustion focus position; and
        an introduction of a pre-injection of fuel.

2. The method of claim 1, further comprising using as the measure for the stability of the combustion process in the at least one cylinder by one or more of the following:
    a standard deviation for a position of a combustion focus that has been obtained by a predefined amount of combustion cycles;
    a standard deviation of an average induced cylinder pressure;
    a standard deviation of a maximum pressure gradient in the at least one cylinder;
    a standard deviation of a maximum differential energy release;
    a standard deviation of a maximum integral energy release;
    a relation of said standard deviations to an average value of an averagely induced cylinder pressure; and
    a parameter that has been deduced from said parameters.

3. The method of claim 1, further comprising determining the parameter that is characterizing the combustion process by one or more of the following:
    a determination of a cylinder pressure;
    a determination of a mechanical vibration at the combustion engine;
    an engine speed of the combustion engine; and
    an ionic current of a probe in the at least one cylinder.

4. The method of claim 1, further comprising creating the measure for the stability of the combustion process at predefined operating points of the combustion engine.

5. The method of claim 1, further comprising increasing the remaining gas mass in the cylinders of the combustion engine by an early closing of a corresponding exhaust valve during an output stroke or by a short opening of the corresponding exhaust valve during a suction stroke.

6. The method of claim 5, further comprising determining the composition of the fuel mixture with the aid of a correcting intervention into a regulation of the combustion engine for complying with the threshold value for the measure for the stability of the combustion process.

7. The method of claim 1, further comprising determining the composition of a benzene/alcohol-fuel mixture; and regulating or controlling the stability of the combustion process of a self-igniting combustion engine that is operated with benzene or a benzene/alcohol-fuel mixture.

8. A self-igniting combustion engine comprising:
    a device configured for determining a composition of a fuel mixture consisting of a first fuel and at least a second fuel for operating the self-igniting combustion engine with a variable or partially variable valve operation for a variable adjustment of valve openings in relation to a crankshaft angle and for a variable adjustment of opening profile of the valves;
    a direct injection for metering the fuel mixture;
    at least one sensor for determining the combustion process in at least one cylinder of the combustion engine;
    a regulating unit for regulating the combustion engine on the basis of the output signal of the at least one sensor; and
    an engine electronic unit, wherein the output signal of the sensor is delivered to the engine electronic unit as a measure for the combustion process and saved over a predefined amount of combustion cycles, and wherein for determining a measure for the stability of the combustion, a statistic evaluation of the combustion courses is carried out within the engine electronic unit and that from the obtained measure for the stability of the combustion, the composition of the fuel mixture can be determined and a correction of the regulation of the combustion engine can be carried out.

9. The self-igniting combustion engine according to claim 8, further comprising at least one cylinder pressure sensor or at least one sensor for determining the mechanical vibration of the combustion engine or at least an engine speed sensor or at least one sensor for determining the ionic current in a cylinder for determining the course of the combustion.

* * * * *